United States Patent [19]

Müller et al.

[11] 4,074,064
[45] Feb. 14, 1978

[54] ENCAPSULATED, GAS-INSULATED HIGH-VOLTAGE APPARATUS HAVING INCREASED RESISTANCE TO ARC ACTIVITY

[75] Inventors: Kurt Müller; Friedrich Richter; Heinz-Helmut Schramm, all of Berlin, Germany

[73] Assignee: Siemens Aktiengesellschaft, Munich, Germany

[21] Appl. No.: 525,228

[22] Filed: Nov. 19, 1974

[30] Foreign Application Priority Data

Nov. 29, 1973 Germany ............................ 2360071

[51] Int. Cl.² ............................................. H01B 9/04
[52] U.S. Cl. .................................... 174/28; 174/16 B
[58] Field of Search ............... 174/28, 29, 16 B, 22 C, 174/11 R, 99 B

[56] References Cited

U.S. PATENT DOCUMENTS

| 3,356,785 | 12/1967 | Yoshida et al. | 174/28 |
| 3,391,243 | 7/1968 | Whitehead | 174/28 |
| 3,448,202 | 6/1969 | Whitehead | 174/28 |
| 3,629,486 | 12/1971 | Swampillai | 174/28 X |
| 3,781,454 | 12/1973 | Olsen | 174/28 X |
| 3,801,725 | 4/1974 | Farish | 174/28 |
| 3,814,831 | 6/1974 | Olsen | 174/28 |

Primary Examiner—Arthur T. Grimley
Attorney, Agent, or Firm—Kenyon & Kenyon, Reilly, Carr & Chapin

[57] ABSTRACT

A gas-insulated, high-voltage apparatus wherein arcs can develop includes an encapsulation and at least one electrical conductor made of aluminum or an alloy thereof which is held in spaced relation to the encapsulation by insulators. A surface is arranged at the conductor at locations thereof subject to the greatest arc activity. The surface faces the encapsulation and is defined by an electrically conductive, arc-resistant material. An excessive stress and endangerment of the encapsulation because of arc action is thereby prevented.

7 Claims, 12 Drawing Figures

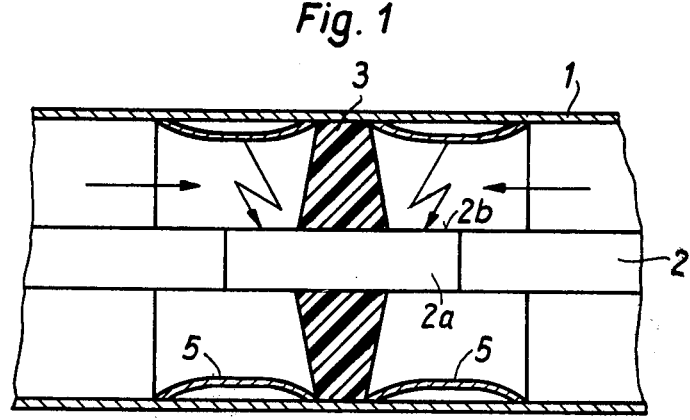
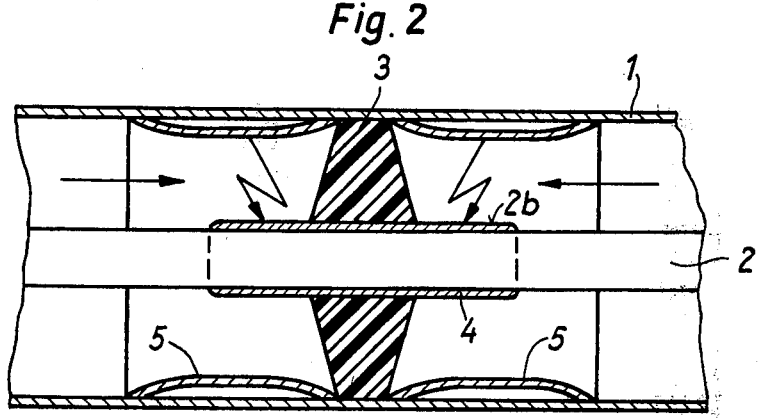

ENCAPSULATED, GAS-INSULATED HIGH-VOLTAGE APPARATUS HAVING INCREASED RESISTANCE TO ARC ACTIVITY

BACKGROUND OF THE INVENTION

The invention relates to an encapsulated high-voltage apparatus insulated by sulfur hexafluoride which has at least one electric conductor of aluminum or an aluminum alloy and which carries the high voltage and is braced to the encapsulation by means of parts made of insulating material.

In encapsulated high-voltage devices such as metal-encapsulated, gas-insulated high-voltage lines, it is known to brace the electric conductors to the preferably grounded, electrically conducting encapsulation by means of parts made of insulating material. The conductors consist of aluminum or an aluminum alloy and carry the high voltage. In connection with such high-voltage lines, reference may be had to *Deutsche Offenlegungsschrift* No. 2,118,176.

Also, in metal-encapsulated high-voltage switch gear with a gaseous insulating means such as sulfur hexafluoride, the high voltage conductors may consist of aluminum. In case of fault conditions, in particular in the case of a breakdown of the dielectric, an arc forms between the electric conductor carrying the high voltage and the outer encapsulation which leads, at least in the places where it remains for any length of time, to a high thermal stress of the high-voltage apparatus and may also lead to an additional stress of the encapsulation and of the electric conductor due to the selection of an aluminum material as the material of the electric conductor, the aluminum being desirable for cost reasons.

Under the action of a standing arc, and the heating in the area of the arc associated therewith, not only are the metal parts heated, but if the sulfur hexafluoride is used as the insulating gas, components of this insulating gas are dissociated. Above a certain critical temperature, the fluorine split off from the sulfur hexafluoride will react with the aluminum, the chemical reaction being exothermic. Therefore, a chemical process is initiated which can lead to the destruction of the high-voltage apparatus even after the extinction of the electric arc because the initiated exothermic chemical process can lead to the further dissociation of the insulating gas thereby endangering the high-voltage apparatus.

Accordingly, it is an object of the invention to provide an encapsulated, gas-insulated high-voltage apparatus which affords increased resistance to direct or indirect arc action.

SUMMARY OF THE INVENTION

To increase the resistance of the high-voltage apparatus to direct or indirect arc action and according to a feature of the high-voltage apparatus of the invention, the electric conductor thereof presents, at the points of greatest arc stress, a surface facing the encapsulation of the apparatus which is defined by an arc-resistant, electrically conductive material.

Suitable as an arc-resistant material are substances having a reaction heat during reaction with fluorine which is lower than the reaction enthalpy required for a chemical reaction between the conductor material and the fluorine split off from the sulfur hexafluoride $SF_6$ under arc action. Such materials are, for example, copper for the electric conductor and steel for the encapsulation.

The conductor surface of arc-resistant material is preferably formed by a shielding part surrounding the electric conductor. However, the surface may also be formed by a longitudinal segment of the electric conductor. In both cases, in an encapsulated, gas-insulated high-voltage apparatus, success is achieved in conbining the advantages of aluminum as a conductor material with those advantages of the conventional high-voltage devices wherein the encapsulation is of steel and the conductor is of copper.

It has been shown to be beneficial to provide an arc-resistant inner surface for the encapsulation at least in the area of the conductor surface. Such a configuration is described in U.S. Pat. No. 3,814,831, for example.

In an especially advantageous embodiment of the sulfur hexalfuoride insulated, metal-encapsulated, high-voltage apparatus according to the invention wherein the arc is caused to migrate after its occurrence by the action of electrodynamic forces and wherein the arc can only remain standing at predetermined locations defined, for example, by insulators which serve to brace the electrical conductor and which fill the clear cross-section of the encapsulation in a manner impenetrable to the arc, the conductor surface and the inner arc-resistant encapsulation surface are provided at both sides of each insulator.

Although the invention is illustrated and described herein as an encapsulated, gas-insulated high-voltage apparatus having increased resistance to arc activity, it is nevertheless not intended to be limited to the details shown, since various modifications may be made therein within the scope and the range of the claims. however, invention, however, together with additional objects and advantages will be best understood from the following description and in connection with the accompanying drawings.

BRIEF DESCRIPTION OF THE DRAWINGS

FIG. 1 is an elevation view in longitudinal section of an encapsulated, gas-insulated high-voltage apparatus according to the invention. The apparatus shown here is a metal-clad, compressed-gas high-voltage line for transmitting electric energy. The embodiment of the invention shown here incorporates a longitudinal conductor segment for defining the surface of electrically conductive, arc-resistant material facing the encapsulation.

FIG. 2 illustrates an alternate embodiment of the invention also applied to a high-voltage transmission line. In this embodiment, a shielding member at the conductor defines the surface of electrically conductive, arc-resistant material facing toward the encapsulation.

DESCRIPTION OF THE PREFERRED EMBODIMENTS OF THE INVENTION

The high-voltage line of FIG. 1 consists of a preferably tubular encapsulation 1 and an electric conductor 2 carrying the high voltage and braced to the encapsulation by means of a disc-shaped insulating part 3. The interior of the encapsulation 1 is filled with sulfur hexafluoride as gaseous insulator and the electric conductor consists of aluminum or an aluminum alloy. The bracing insulator 3 fills out the cross-section of the encapsulation 1 impenetrably to the arc. The arc which forms during operation can dwell at the region of the insulator. Accordingly, to increase the arc resistance, the electric conductor 2 is continued at the locations of arc dwell, namely in the area of the bracing insulator 3, as a conductor segment 2a consisting of a material having a reaction heat lower than the reaction heat required for a chemical reaction between the fluorine split off from the sulfur hexafluoride by arc action and the material of the conductor segment 2a. The conductor segment 2a consists preferably of copper. In places of greatest arc stress, surface means in the form of conductor segment 2a therefore defines a surface 2b facing the encapsulation 1 and consisting of an arc-resistant, electrically conductive material.

As FIG. 2 shows, this arc-resistant surface 2b may also be formed by a shield 4 which surrounds the conductor 2 consisting of aluminum or an aluminum alloy. The shield 4 is preferably made of copper and replaces the longitudinal section 2a of the electric conductor 2 shown in FIG. 1.

In both embodiments, the encapsulation 1 can be additionally provided with an arc-resistant inner surface 5, at least in the area of the surface 2b of the electric conductor 2. Since the insulating body impenetrable to an arc is described in the above embodiments as one of the places where an arc formed during operation can dwell, the arc-resistant conductor surface 2b and the inner arc-resistant encapsulation surfaces 5 are provided on both sides of the insulating body 3. The encapsulation surface 5 may also consist of copper, but may also be steel. Further, in selecting the material for the encapsulation surface in the places of greatest arc stress, care should be taken that the reaction temperature of the material is lower than the reaction heat required for a chemical reaction between the material and the fluorine split off from the $SF_6$ under arc action.

Not only is the arc resistance of the encapsulated, gas-insulated high-voltage apparatus increased by utilizing the arrangement of the invention as far as the direct effect of the arc is concerned, there is also no damage or endangerment of the high-voltage apparatus because of indirect arc influences, in particular because of exothermic chemical reactions. The advantage inherent in the use of aluminum or aluminum alloys as the material for the electric conductor and, if applicable, also for the encapsulation, can be largely retained by utilizing the invention to take special measures only at the locations of greatest arc stress.

What is claimed is:

1. In a gas-insulated, high-voltage apparatus wherein arcs can develop, the apparatus including: a metal enclosure; at least one electrical conductor made of aluminum or an alloy thereof; and an insulator for holding said conductor in spaced relation to said metal enclosure; and, wherein the improvement comprises: a metal member arranged at said conductor at locations thereof subject to the greatest arc activity, said metal member having a surface of electrically conductive, arc-resistant material facing said metal enclosure, said material having a reaction enthalpy less than the reaction enthalpy required to cause a chemical reaction of the material of said conductor with the gas under the action of an arc forming during the operation of the apparatus.

2. The apparatus of claim 1 wherein the insulating gas is sulfur hexafluoride ($SF_6$).

3. The apparatus of claim 1 wherein the insulating gas is sulfur hexafluoride, said material having a reaction enthalpy less than the reaction enthalpy required to cause a chemical reaction of the material of said conductor and the fluorine liberated from the sulfur hexafluoride under the action of an arc forming during the operation of the apparatus.

4. The apparatus of claim 1, said surface means being a shielding member disposed in surrounding relation to the electrical conductor, said shielding member having a surface defined by material made of electrically conductive, arc resistant material facing said metal enclosure.

5. The apparatus of claim 1, said surface means being a longitudinal segment of the electrical conductor, said segment having a surface defined by material made of electrically conductive, arc resistant material facing said metal enclosure.

6. The apparatus of claim 1, said metal enclosure being equipped with ancillary surface means defining an arc resistant inner surface at least at the region of said first-mentioned surface means at said electrical conductor.

7. The apparatus of claim 6, said insulator means being a plurality of spaced insulators for supporting said conductor in spaced relation to said metal enclosure, each of said insulators filling out the cross-section of said apparatus between said conductor and said metal enclosure so as to be impenetrable to the arc, and said ancillary surface means of said metal enclosure and said first-mentioned surface means at said conductor being disposed to both sides of each of said insulators.

* * * * *